United States Patent
Boerner et al.

(10) Patent No.: US 10,577,558 B2
(45) Date of Patent: Mar. 3, 2020

(54) METHOD FOR A COMBINED CELL DIGESTION AND EXTRACTION OF OIL-CONTAINING SEEDS

(71) Applicants: B+B ENGINEERING GMBH, Magdeburg (DE); FRAUNHOFER-GESELLSCHAFT ZUR FÖRDERUNG DER ANGEWANDTEN FORSCHUNG E.V., München (DE)

(72) Inventors: Gunter Boerner, Sülzetal (DE); Sebastian Brodkorb, Magdeburg (DE); Daniela Pufky-Heinrich, Markkleeberg (DE); Sandra Franke, Naumburg (DE); Sarah Polage, Leisnig (DE); Marcus Zang, Markkleeberg (DE)

(73) Assignees: B+B Engineering GmbH, Magdeburg (DE); Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 0 days.

(21) Appl. No.: 15/758,803

(22) PCT Filed: Sep. 3, 2016

(86) PCT No.: PCT/DE2016/000337
§ 371 (c)(1),
(2) Date: Mar. 9, 2018

(87) PCT Pub. No.: WO2017/041776
PCT Pub. Date: Mar. 16, 2017

(65) Prior Publication Data
US 2019/0085261 A1    Mar. 21, 2019

(30) Foreign Application Priority Data
Sep. 11, 2015  (DE) .................. 10 2015 011 889

(51) Int. Cl.
*C11B 1/10* (2006.01)
*C11B 1/02* (2006.01)
(Continued)

(52) U.S. Cl.
CPC ............. *C11B 1/108* (2013.01); *A23K 10/37* (2016.05); *C11B 1/02* (2013.01); *C11B 1/04* (2013.01);
(Continued)

(58) Field of Classification Search
CPC . C11B 1/108; C11B 1/102; C11B 1/02; C11B 1/04; C11B 1/10; C11B 3/006
See application file for complete search history.

(56) References Cited

U.S. PATENT DOCUMENTS

| 3,816,389 A | 6/1974 | Mihara et al. |
| 4,158,656 A | 6/1979 | Jones et al. |

(Continued)

FOREIGN PATENT DOCUMENTS

| CA | 1333402 | * 12/1994 | .............. C11B 1/10 |
| DE | 145 925 A1 | 1/1981 | |

(Continued)

OTHER PUBLICATIONS

International Search Report issued by the European Patent Office in International Application PCT/DE2016/000337.
(Continued)

*Primary Examiner* — Yate' K Cutliff
(74) *Attorney, Agent, or Firm* — Ursula B. Day, Esq.

(57) ABSTRACT

The invention relates to a method of combined cell digestion and extraction of oil-containing seeds having an oil content of >30% by mass, wherein production of a slurry from the oilseeds and ethanol is followed by a combination cell digestion with a subsequent ethanolic extraction, wherein the smaller portion of the oil of the oilseed and the alcohol- (Continued)

soluble constituents present therein are dissolved in the ethanol in accordance with the dissolution capacity of the ethanol for the oil and the alcohol-soluble constituents, a greater portion of the oil is displaced from the seed cells by the ethanol, forming a free oil phase in the ethanol. The free oil phase is removed and, according to the invention, has semi-raffinate quality, reducing the complexity of refining as an advantage of the method of the invention.

17 Claims, 3 Drawing Sheets

(51) Int. Cl.
  *C11B 3/00* (2006.01)
  *A23K 10/37* (2016.01)
  *C11B 1/04* (2006.01)
(52) U.S. Cl.
  CPC ............... *C11B 1/10* (2013.01); *C11B 3/006* (2013.01); *Y02P 60/877* (2015.11)

(56) References Cited

U.S. PATENT DOCUMENTS

| | | |
|---|---|---|
| 4,298,540 A | 11/1981 | Youn et al. |
| 4,515,726 A | 5/1985 | Sullivan |
| 5,928,696 A | 7/1999 | Best et al. |
| 2004/0047972 A1 | 3/2004 | Wasche et al. |

FOREIGN PATENT DOCUMENTS

| | | | | |
|---|---|---|---|---|
| EP | 0 312 855 B1 | | 2/1994 | |
| EP | 0 721 980 A2 | | 7/1996 | |
| GB | 2 060 673 A | | 5/1981 | |
| GB | 2060673 | * | 5/1981 | ............... C11B 1/10 |
| WO | WO 96/05278 | | 2/1996 | |
| WO | WO 02/054884 A1 | | 7/2002 | |

OTHER PUBLICATIONS

A. Wäsche: "Simultane Öl-und Proteingewinnung bei Raps", 2002, pp. 17, 124-126. ("Simultanous Oil-and Protein Production from Rape" 2002, p. 17, 124-126).

W. Brautzsch: "Die Ethanol-Extraktion—ein Verfahren zur Verbesserung der Qualität von Extraktionsölen und-schroten des Rapses", 1984, p. 104. ("The Ethanol Extraction—a Method for Improving the Quality of Extraction Oils and-Grinding of Rape". 1984, p. 104).

K. Schwister, V. Leven: "Verfahrenstechnik für Ingenieure: Ein Lehr-und Übungsbuch" 2013, p. 197-198, ISBN 978-3-446-43136-2. (Technology for Engineers: A Text-and Exercise Book 2013, p. 107-198).

* cited by examiner

METHOD FOR A COMBINED CELL DIGESTION AND EXTRACTION OF OIL-CONTAINING SEEDS

CROSS-REFERENCE TO RELATED APPLICATIONS

This application is the U.S. National Stage of International Application No. PCT/DE2016/000337, which designated the United States and has been published as International Publication No. WO 2017/041776 A1 and which claims the priority of German Patent Application, Serial No. 10 2015 011 889.7, filed Sep. 11, 2015, pursuant to 35 U.S.C. 119(a)-(d) the description of which is hereby incorporated by reference.

SUMMARY OF THE INVENTION

The invention refers to a method of combined cell digestion and extraction of oil-containing seeds.

To realize maximal oil yields in the modern oilseed processing industry, extraction agents are used that are mainly mixtures of n-paraffin (C5, C6, C7), so called special boiling point gasoline, or pure n-paraffins (preferably hexane) as these possess a high dissolving capacity for triglycerides and are advantageously distilled from the miscella. The technologies that have been perfected in the last decades allow to exploit, aside from high oil yields, the extraction of feed stuff from the extraction residue and as by-product mixtures of various phospholipids to obtain lecithin.

Alternative to solvent extraction, different methods of mechanical oil production were introduced to the industry, such as for example cold- and hot press methods with or without prior mechanical or thermal pretreatment. A disadvantage of the mechanical method for extracting oil is the markedly lower oil yields, though there is improved oil quality as compared to the solvent extraction.

A solvent extraction requires a mechanical and thermal preparation of the seed. This way, effective access of the solvent to the oil into the cells of the oilseed is realized. At the same time, sufficient percolation during contact of the solvent with the processed oil seed must be insured. Industrial method steps for processing the seeds are crushing, fracturing, flaking and subsequent thermal conditioning followed by mechanical pressing as a first step of the oil production. Processing of the oilseed and solvent extraction are thus an inseparable combination.

Use of special boiling point gasoline or n-hexane as solvent on the one hand insures high economic efficiency, but on the other hand has substantial disadvantages. In the conventional methods for extraction with hydrocarbons undesired fatty by-products (for example phospholipids, lipochrome) are being extracted. When produced according to the conventional hexane-method, the oil must be completely refined.

Special boiling point gasoline and n-hexane are not suited to extract specific anti-nutritive substances, (for example, glucosinolate and its hydrolysis products with rapeseed) from the seed, unless they are extracted with the oil as lipophile components. For example with rapeseed, glucosinolate and its hydrolysis products remain in the extraction residue and thus limit the marketing of this product.

Furthermore, the use of special boiling point gasoline and n-hexane for the production of food- and feed stuffs is questionable at best since these are deemed harmful even in traces. The afore-stated disadvantages have been motivators for decades to search for alternative solvents with methods that are adjusted accordingly.

Use of condensed gas mixtures are an alternative to extraction of oils and fat from oilseed (EP 0721980 A2). With a mixture of propane and carbon dioxide, each in below critical condition, the selective extraction of pure oils is realized. When the system is decompressed, the solvent evaporates, so that oil and extraction meal are obtained in a solvent-free manner.

A further method uses super critical carbon dioxide as a solvent for deoiling (WO002/054884 A1). By means of a targeted use of supercritical $CO_2$ a deoiled extraction meal can be realized with a high content of lecithin and is almost entirely oil free. The so-obtained protein isolates are distinguishable by a prominent emulsifying capacity that is markedly different from comparable products. As compared with the conventional hexane-extraction, the oil extraction with condensed gases is definitely cost intensive and not sufficiently competitive in industrial applications due to processing high day quotas of oilseed. Therefore, their use is only feasible for production of high-priced products and ingredients within the framework of a highly specialized production.

The FRIOLEX®-method describes a process for a hexane-free direct extraction of lipids and rests on the displacement of the oil by means of water from pre-crushed oil containing starting materials. It was developed by GEA Westfalia Separator AG and Dr. Frische GmbH (WO 96/05278 A1) and is based on the use of a special decanter centrifuge for the mechanical separation of the oil, such that an energy intensive distillation is avoided. High quality oil that compares to cold-pressed plant oils can be realized. The contact between oil and water as extraction agent in the presence of phospholipids acting as emulsifying agent, lead to the formation of emulsions which significantly complicate phase separation.

A further method of aqueous oil extraction was developed at the Technical University Berlin. Since lipids are not soluble in water, the method is based on the displacement of the oil from the seed, analog the afore-referenced FRIOLEXO-method. In order to realize the oil displacement, a more intensive mechanical cell digestion, as compared to the conventional processing, is necessary. Furthermore, the necessary displacement of the oil from the cell of the oilseed does make it impossible to use a percolation extractor. The extraction is thus carried out with a stirring reactor. The advantage of this method is that the costly distillation to remove the solvent is avoided. However, the expensive disposal of the process water and the formation of the stable emulsions are disadvantageous so that this type of oil extraction is not used as an industrial process (dissertation A. Wäsche, "Simultaneous Oil- and Protein Production with Rape", 2002, page 124-126).

Oil production with alcohol solvents has been Investigated for years. Especially ethanol and isopropanol were at the center of Investigations to develop alternative methods for oilseed extraction. In his dissertation, W. Brautzsch has investigated ethanol oil extraction on the laboratory level. The basic method steps as used in the extraction with hexane are not substantially changed. It starts with an analog seed processing but without pressing the oilseed before the extraction (direct extraction). However, when selecting this method, in order to extract the oil from the seed, complete oil solubility in ethanol has to be achieved. That is, the extraction takes place at temperatures above 100° C. and at a pressure of greater than 3 bar. These procedural base conditions require the construction of a new extraction apparatus. Conventional extractors are no longer suited for this. It could be shown that a very pure oil can be produced. Based on the low selectivity of the ethanol, anti-nutritive substances, for example glucosinolate were extracted so that a high quality low glucosinolate rape extraction can be achieved. These advantages could not weigh against the economic disadvantages of a more costly extraction, so that a transfer to industrial application was not accomplished (dissertation W. Brautzsch, "The Ethanol Extraction—a Method for Improving the Quality of Extraction Oils and—Grinding of Rape" 1984, p. 104).

The VEB Kombinat Oil and Margarine in Magdeburg, according to the DDR patent (DD 145 925 A1) and analog the British patent (GB 2 060 673A) 1981, describe a method for treatment of plant thioglucoside-containing raw materials. By means of the described ethanol extraction, *brassica-* and crambeseeds and their processing products can be simultaneously degreased and detoxified.

The dissertation of R. Brautzsch and the above-references patent describes that a suitable oil solubility with *brassica-* and crambeseeds can be realized only at an extraction temperature above the evaporation temperature of the ethanol when a pressure of above 2.5 bar is reached during the extraction. The processing of the seed prior to extraction is carried out in a conventional way, so that a percolation extraction can be realized. The advantage is that through a subsequent lowering of the temperature to 20° C., the dissolved oil partially precipitates from the miscella, so that an energy intensive distilling of the solvent becomes unnecessary. In a further cooling step to below 10° C. other constituents are precipitated. The residual solvent can be repeatedly returned to the extraction cycle without a further purification.

In 1981, the Shell Oil Company of Houston (Texas) described a method for oil extraction using isopropanol. The extraction with isopropanol is basically comparable to ethanol extraction methods. The additional advantage hereby is to realize a good oil solubility at relatively low temperatures as compared to the ethanol extraction. Thus, an extraction in the super pressure range can be forgone (U.S. Pat. No. 4,515,726 A). A main object of the method described in that patent is the production of a phosphatide-/lecithin-rich product from soy beans. As such, the method described is limited to the processing of soy beans. Seed preparation and percolation extraction are utilizing the basic methods applied in the industrial area.

From the afore-described developments it is evident that to date there has been no success in establishing an industrial, comparably economical extraction process for the hexane extraction of oilseed. While there may be single applications when processing soy beans, in case of rape, and other seed with high oil content there has been little success mostly due to economic reasons. Especially in rape processing, a substantial added value potential is lost. This potential lies particularly in the extraction of qualitatively high grade raw oils already at the level of seed processing in production of high grade extraction meal without anti-nutritive substances and high protein content as well as in isolating valuable native constituents.

All afore-stated significant examples start with conventional seed processing (crunching, flocculating, breaking, pressing) that describe the application of a percolation extraction even for alcoholic solvents. This appears to be Insufficient to attain a substantial improvement of a complex extraction process in order to realize an added value potential, especially with seeds high in oil.

A further disadvantage of the above-stated examples is demonstrated in that the processing of almost completely hulled oil seeds is not possible. It is essential for the use of pressing methods that the starting material contains raw fiber- and other roughage as part of the starting seed. These are required for product transport and sustaining pressure in the press. When processing almost completely hulled seeds (i.e. reduced fiber content), pressing methods cannot be used. In that case, the oil production must be carried out exclusively by solvent extraction in the so-called direct extraction.

Currently, percolation extraction is predominantly used for the solvent extraction, the use of which with almost completely hulled seeds has not yet been adequately examined. Hulling is however a pre-condition to produce extraction meals having high protein- and low fiber percentage. A further optimization of the seed processing directed to a completely mechanized cell digestion of the oil seeds appears thus a promising possibility.

In his dissertation, (dissertation A. Wäsche, "Simultanous Oil- and Protein Production from Rape" 2002, page 17) A. Wäsche explains that an alcohol extraction as well as an aqueous extraction require an almost complete cell digestion. It is further described that the size of cells in the seed grain is about 30×20×20 μm. In order to achieve a purely mechanical cell digestion for the extraction, any target size for crushing must be oriented on that size.

A further essential part of the work by A. Wäsche is the very explicit description of a cell digestion. Suitability of rotor-stator systems and high pressure homogenizers was investigated and compared. The analysis shows that in both methods an almost complete cell digestion can be achieved. The two methods differ basically in their steps and the amount of energy input to the system. With high pressure-homogenizers, large specific energies can be almost adiabatically supplied to the system. As a result, due to the high specific energy input, stable emulsions are formed by the high pressure homogenization. When using the rotor-stator, a warming by 40 K and a reduced specific energy input was measured.

Such a production refinement implies further investigations of technical refinement or very fine milling processes. Normally, by adding liquid add-ons (milling aids) agglomeration of product is prevented and the milling process energetically enhanced. These so-called wet methods Include the fast rotating rotor-stator systems, high pressure homogenizers and also ball mills; wherein the latter are ruled out due to their sub-par energy input (K. Schwister, V. Leven "Technology for Engineers: A Text- and Exercise Book" 2013, page 107-198, ISPN 978-3-446-43136-2).

In 1994, Dorr-Oliver Deutschland GmbH patented a method for extraction of plant fats and oils. There, the cell digestion is realized by a series of steps with integrated rotor-stator systems (EP 0312855B1). Transformation into an Industrial method and determination of economic feasibility have so far eluded success.

SUMMARY OF THE INVENTION

The object of the present invention is to provide a method of a combination of an effective cell digestion and extraction with ethanol, wherein almost completely hulled high oil content seeds, for example rapeseed is processed and the end products are oil and extraction meal of a new, qualitatively valuable form of same, processed under gentle conditions and succeeding in a high oil yield and isolation of other valuable constituents. With these multiple advantages, the economic success as compared to the conventional hexane extraction should be ensured. This object is solved by a method according to claim 1. Advantageous embodiments are embodied in the dependent claims.

According to the present invention, a method for a combined cell digestion and extraction of oil containing seed is described:

producing a mash of oilseeds and ethanol as solvent, wherein the oilseeds have an oil content of ≥30 mass %;

digesting the cells of oilseeds with ethanol, wherein the digestion is carried out mechanically up to an average particle size of ≤50 μm;

combining the cell digestion with a subsequent ethanol extraction, wherein the smaller portion of the oil contained in the cells of the oilseeds and the alcohol soluble constituents that are contained therein merge into the ethanol in correspondence with the ethanol solubility of the oil and the alcohol soluble constituents, and a larger portion of the oil is being displaced by the ethanol from the seed cells of the oilseed, wherein a free oil phase is formed in the ethanol, separating the free oil phase and the oil dissolved in the ethanol and separating the alcohol soluble constituents from the alcohol, wherein the free oil phase has a percentage of phosphatides of ≤0.1%, preferably ≤0.025%, and a percentage of free fatty acids of ≤0.5%, preferably ≤0.3%, separation of the remaining extraction residue after extraction and releasing the remaining ethanol in the extraction residue under gentle vacuum conditions, wherein cell digestion and extraction are carried out in a defined mass-ratio of oilseed to ethanol of 1:3 to 1:8, preferably at 1:5.

In the mass-ratio according to the present invention, the amount of released/displaced oils surpasses the solubility of the ethanol at method conditions below atmospheric boiling point of the ethanol, so that the released/displaced oil cannot be dissolved and this free oil is present as a separate liquid phase. This oil can be economically produced without distillation. The oil dissolved in the ethanol can also be separated by lowering its solubility at reduced temperature.

Advantageous is the combination of the oil predominantly displaced from the oilseeds as a separate oil phase and the oil dissolved in ethanol as an extraction phase for gentle production of oil from oil containing seeds.

Within the scope of the present invention, oilseed is designated as oil-rich seeds having an oil content of ≥30 mass % and that can be commercially utilized in the production of plant oil. These are especially rape, flax, sun flower seed and other oilseeds having a similarly high oil content, whose nearly complete oil separation of the starting seed is already commercially carried out with conventional press- and extraction methods.

Miscella (mixture) is designated as a mixture of organic extraction/solvent and oil, which is an intermediate product in the production of plant oils.

Extract mixture is designated as a mixed phase of solvent and oil in the method according to the present invention that can be a by-product from the separating step of the liquid phases between the miscella and the free oil.

Within the scope of the present invention, recyclable materials are alcohol soluble constituents, which in the present invention constitute an additional economic added value in the production of plant oils or whose removal increases the value of the primary products (oil and extraction meal). These are especially phospholipids, phenolic compounds, glucosinolate (rape) and others.

In separating the free oil phase according to the present invention, the free oil phase includes such reduced amounts of phospholipids and lipochrome, that at a subsequent refining step to achieve a food grade quality, the steps of desliming can be omitted to thereby markedly reduce the expense for bleaching. The free oil thus exhibits a semi-raffinate quality. This is characterized by a phosphorus-content of ≤50 ppm, preferably ≤30 ppm, especially preferred ≤10 ppm or a portion of phosphatides of ≤0.1%, preferably ≤0.05%, especially preferred ≤0.025%. In contrast, the normal values for extracted rape oil according to the conventional extraction with hexane have a phosphorus content of ≥300 ppm or a portion of phosphatides of ≤0.75%. The portion of free fatty acids in the free oil phase, according to the method of the present invention is ≤0.5%, preferably ≤0.4%, especially preferred ≤0.3%, wherein normal values according to the conventional extraction method lie between 1.0 to 2.0%. The oil is markedly lighter colored as compared to extracted oils. The so reduced refining expense is the result and an advantage of the method of the present invention.

The separation of the extraction residue that remains after the extraction and removal of the remaining ethanol in the extraction residue, is carried out under gentle conditions in vacuum, wherein gentle conditions is to be understood as temperatures of <90° C., preferably, between 50 and 90° C. and a pressure below atmospheric pressure, preferably between 50 and 500 mbar.

In a first embodiment of the present invention, prior to producing a mash from oilseed and ethanol, an almost complete hulling of the oilseed is carried out, since according to the present Invention, the combination of cell digestion and extraction favors a production with almost completely hulled oil seeds and pursued within the purview of a high protein content in the extraction meal.

In a further variant of the embodiment, the required drying of the oilseed is combined with the desired prior hulling of the oil seeds in advance of the combination of cell digestion and extraction.

In a further embodiment of the present Invention, a mash from the oilseed is provided from the oilseed and the ethanol without any prior hulling.

Figure 1:
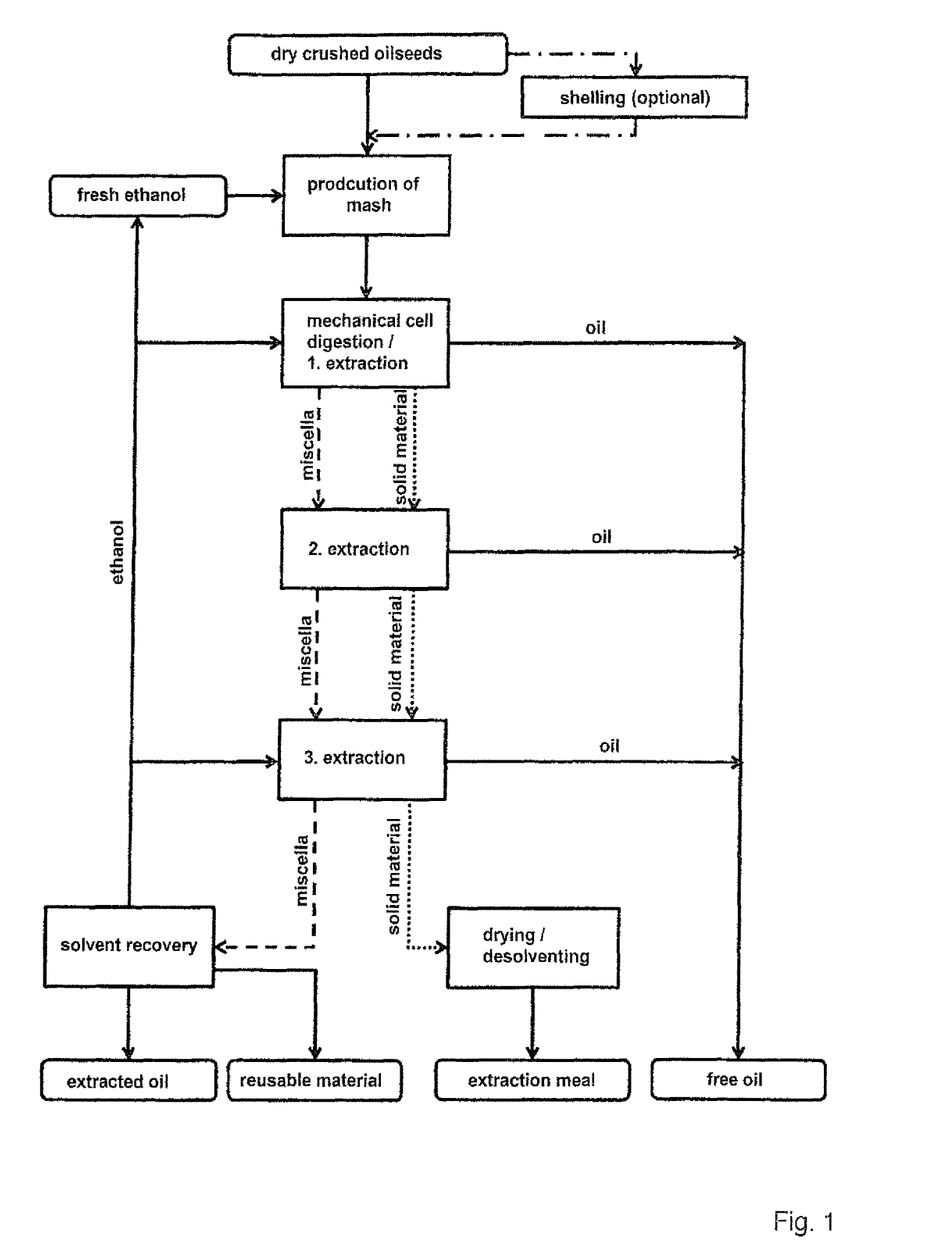
FIG. 1 shows a schematic illustration of the method steps of the present invention in co-current flow—exemplary in a three-step extraction.
Figure 2:
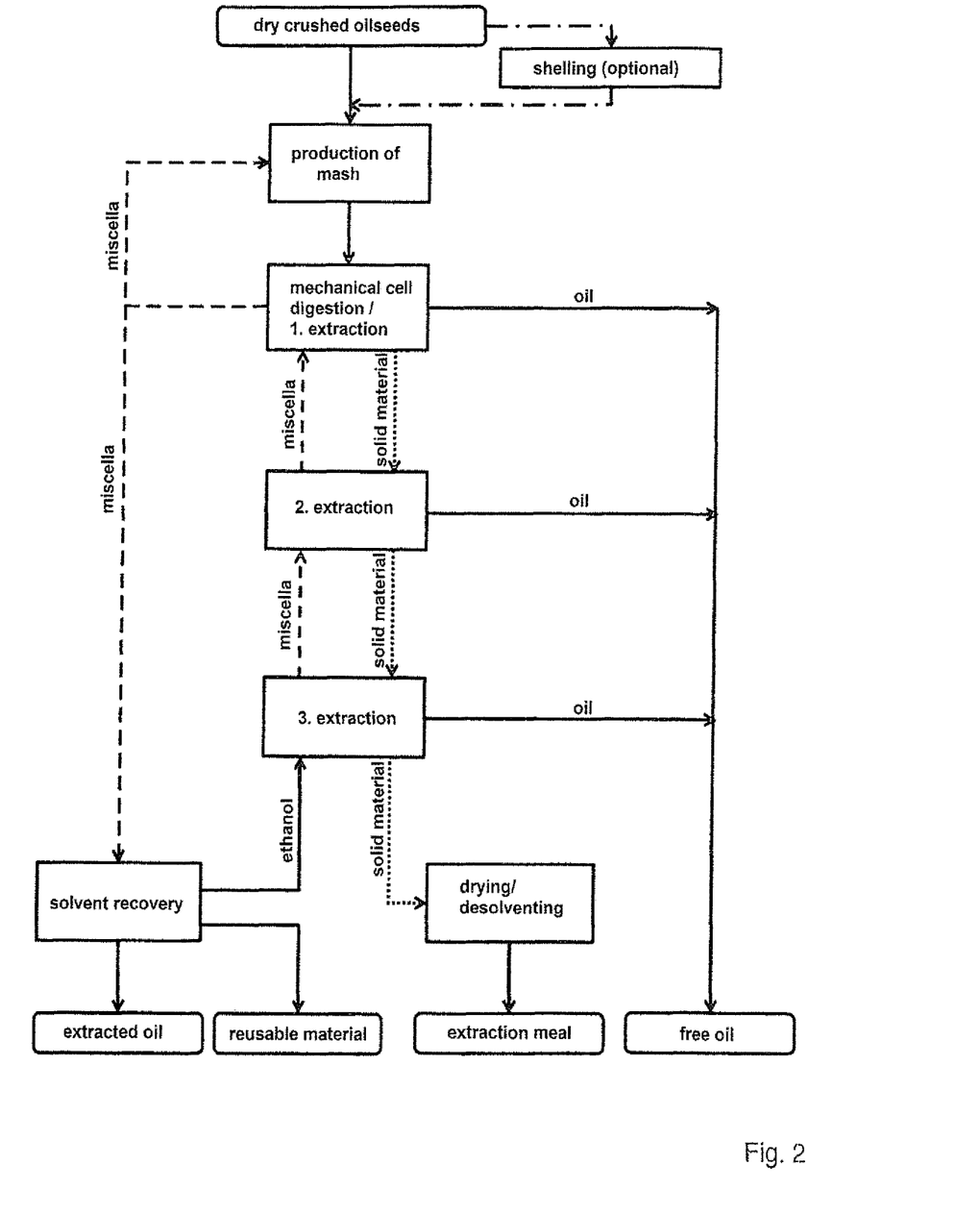
FIG. 2 shows a schematic illustration of the method steps of the present invention in an reverse current flow exemplary in a three-step extraction.

In a further embodiment of the present invention, the method is conceived as a multistep continuous or, quasi continuous method, in parallel flow (FIG. 1) or in inverse flow (FIG. 2). A combination of both is also possible.

In a further embodiment of the present invention, the cell digestion by means of a rotor/stator system, or by means of high pressure homogenizers, in a preferred variant by means of a rotor-stator system with which a cell digestion up to an average particle size of ≤50 μm can be realized and where the energy input does not lead to a thermal damage of the oilseed.

In a further embodiment of the present invention, the separation of the liquid phase (miscella/free oil) from the extraction residue is carried out by means of pressure filters, screen head extruders, centrifuges or decanters, wherein a separation of the fine and the very fine particles has to be ensured.

In a further embodiment, after the cell digestion, the separation of the ethanol miscella from the free oil phase is carried out in a sedimentation tank or by means of centrifugal force. Of importance hereby is that prior to the separation of the free oils, the miscella is cooled to preferably 4°

C. to 25° C. In a continuous method this is carried out via a separate heat exchanger or via heat exchange surfaces in the sedimentation tank.

In a further embodiment, the extraction is carried out below atmospheric boiling point of ethanol. Preferably, the extraction is carried out at ambient pressure and temperature of about 70° C.

In a further embodiment, the alcohol-damp extraction residue, after the concluded extraction, is mechanically pressed and subsequently gently dried preferably in a vacuum dryer to remove the ethanol.

In a further embodiment of the present invention after concluded separation of the free oil phase from the miscella, the same is being returned to the remaining extraction residue. Thereby the separated miscella can be reused in further extraction replacement steps.

In a further embodiment of the present invention, the ethanol is recovered at the separation of the dissolved oil and the constituents from the miscella as well as from the extraction mix. This allows the repeated use of the ethanol for further extraction steps up to the almost complete extraction of the oil and the constituents from the oilseed.

In a further embodiment, the recovery of the ethanol is carried out by means of vacuum evaporation. Prior to the evaporation, concentration of the miscella can be carried out by means of a membrane separation method, preferably by ultra filtration.

In one embodiment of the present invention, use of seeds of high oil content, such as rape, flax, sunflower seeds, preferably rape, is much favored.

The method of the present invention represents a combination of an effective cell digestion of dried and shredded, hulled or non-hulled oilseed in a multistep extraction method that is operated as a continuous or quasi continuous method, in either parallel flow or in Inverse flow; where combining both methods is also possible. A conditioning and pressing of the oilseed as practiced with the conventional method can be forgone.

For the cell digestion, a mash from the oilseed and ethanol is produced. Through mechanical treatment the oilseed is comminuted, to effect a cell digestion in order for the oil to be released.

The extraction of the oil is carried out with ethanol as well as a miscella from ethanol and oil which is a combination of solvent- and displacement extraction. In this manner, and under gentle extraction conditions, it is possible to limit the ethanol amount. The extraction is carried out in several steps. Thereby, all alcohol soluble constituents in the cell matrix and those in the dissolved and displaced oil dissolve into the ethanol. The dispersed oil droplets form a downward sediment in the solvent and form a separate oil phase.

After the concluded extraction, the solid extraction residue is mechanically separated and dried. After cooling, the liquid extract is separated into miscella, extraction mix and free oil. After the refinement process, the miscella and the recycled ethanol is again returned to the process.

This type of method is characterized in that the entire oilseed process can take place without pressing the oilseed; instead, separation takes place solely through solvent- and displacement extraction with ethanol, in particular, with respect to rapeseed; it further succeeds in eliminating the largely anti-nutritive substances from the product phases, extraction meal and oil, as well as the bitter- and color compounds. This is a precondition for the use of the extraction meal as a high value feed and acts as starting product for the production of high-grade proteins, in particular with respect to rape. For example, rape extraction meal can become the value determinative product in rape processing. Valued constituents such as phospholipids, phenolic compounds or glucosinolate are more accessible and Increase considerably the added value for example, of rape. In addition, the processing strategy permits the simple isolating of a raw oil with a markedly higher quality as compared to the established industrial process (see above re: semi-raffinate quality).

A special advantage of the process is seen in that the extraction is carried out below the boiling point of ethanol and under atmospheric conditions. Despite low solubility of the ethanol under those condition, a complete extraction takes place through the displacement of the oil from the seed cell. The so displaced oil is present as a free oil phase and can be produced by a simple separation process. The oil of the free oil phase advantageously exhibits a semi-raffinate quality. The ethanol can be returned to the process in simple manner via a separation step.

A solution to the problem can be also contemplated as a combination of the afore-described embodiments and their respective method steps.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

In a first embodiment, with reference to FIG. 1 the method of the co-current is shown in an example of rapeseed in a three step extraction.

From the oilseed, which for example was previously dried and crushed, together with the ethanol, a mash is produced followed by the mechanical cell digestion, for example by means of a rotor-stator system. Thereafter, the solvent and displacement extraction follows, during which a part of the oil is dissolved in the alcoholic phase and when the solubility capacity of the alcoholic solvent is surpassed (displacement) the oil collects as droplets in the alcoholic solvent. After that, a separation of miscella and free oil phase follows. After separation of the free oil phase, the miscella can be reused directly for additional displacement steps. Furthermore, at the solvent recovery which is carried out by means of an evaporator, separation of the dissolved oil from the other constituents that are bottom products (distillation residue) takes place. This makes a repeated utilization of the alcoholic solvent (distillate) possible.

The extraction and displacement method results in free and dissolved oils, alcohol soluble constituents such as phospholipids, phenolic compounds or glucosinolates, and a solid matter phase (rape extraction meal), which can be considered as high quality feedstuff or as starting product for protein extraction.

Alternatively, in a further embodiment, FIG. 2 illustrates the afore-described embodiment in the form of an inverse flow process. There, the mash is produced from the starting product and the miscella. Fresh ethanol is added at the end of the extraction and in inverse flow through the process steps, brought to solid matter.

Figure 3:
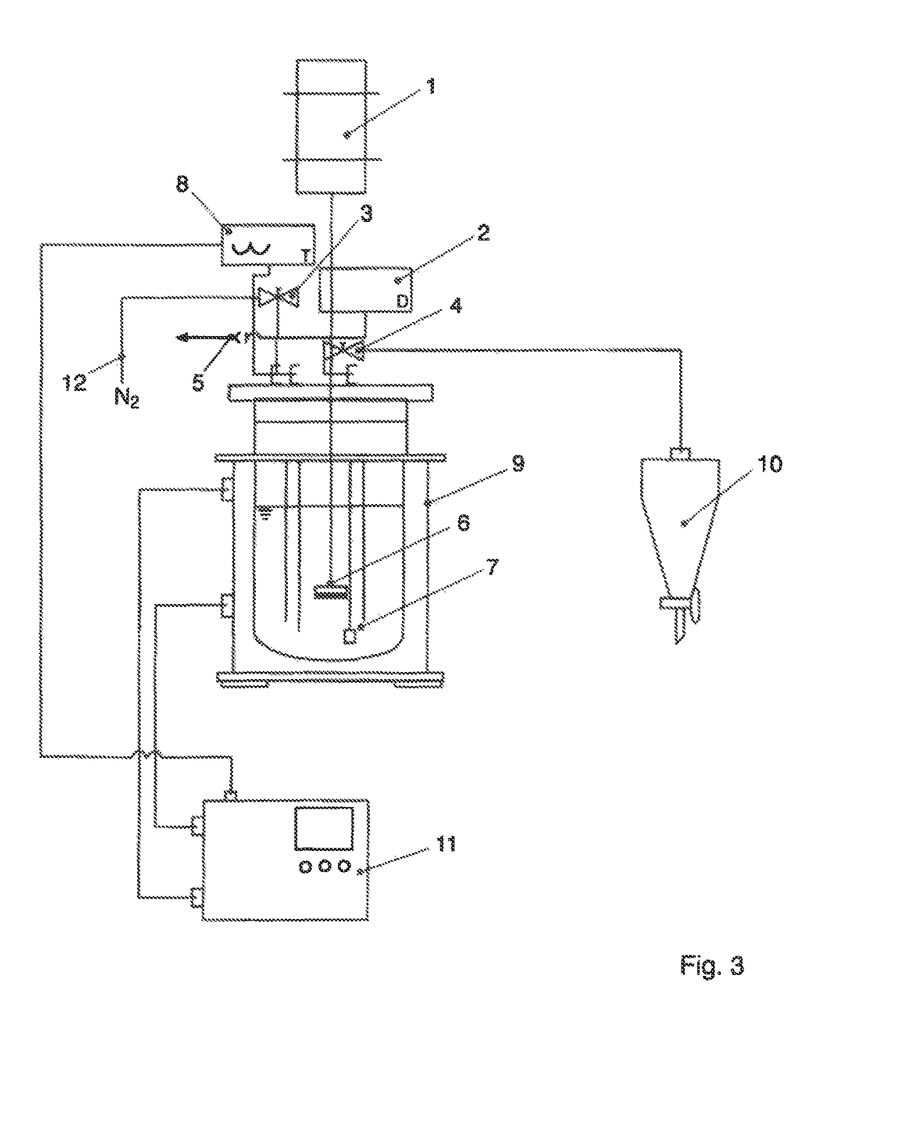
FIG. 3 shows a schematic illustration of an extraction arrangement.

In a further embodiment, the method of the present invention as described in FIG. 3 and scaled for the laboratory.

122 g rapeseed (hulled or non-hulled) are suspended in 488 g 96% by vol. ethanol in a 1 l pressure reactor 9. The reactor 9 and the ethanol were preheated to 60° C.

Subsequently, the pressure reactor is closed and the ambient air replaced by nitrogen gas. The cell digestion is carried out by the built-in rotor-stator 1 with the dispersion tool 6 at a rotations speed of 18.8 m s$^{-1}$.

After 15 min. the seed is completely digested, that is, the average particle size is about 30 μm. During the cell digestion, the alcoholic solution was saturated with oil (miscella). The superfluous free oil (oil$_1$) that could not dissolve is present as free oil droplets in the miscella. Furthermore, the alcohol soluble constituents (phospholipids, oligosaccharides, phenolic compounds and glucosinolate) are dissolved in the miscella and are visible as orange-red color.

The pressure reactor 9 is subsequently pressurized (2-3 bar). Through a built-in filter frit (pore size 15 μm), the liquid phase (miscella and free oil) is pressed out and lead into a separating funnel 10. The filtration lasts about 1-2 hours. When stirring the suspension during filtration, the formation of a filter cake is prevented. In this manner, the duration of the filtration is reduced to about 15-30 min. Remaining in the reactor after filtration is a partially deoiled extraction residue with a portion of miscella of 40-60%.

In the separation funnel 10 the liquid phases separate from each other. The orange-red miscella forms the upper phase and the free oil sinks to the bottom. The miscella cools down to room temperature. Thereby, the maximal oil solubility is reduced, that is, the oil dissolved in the miscella partially precipitates and also sinks downward in the separation funnel. Additionally, a third phase, the so-called extraction mix can form in between.

The free oil (oil$_1$) is drawn from the separation funnel 10. Thereafter the miscella is returned to the pressure reactor 9. In the pressure reactor 9, the miscella is stirred and heated to 60° C. Subsequently, the afore-described filtration steps, the separation of the free oil and the return of the miscella are repeated to the point where after filtration no more free oil (oil$_1$) remains in the separation funnel.

By applying ultrasound and use of the stirrer, the amount of separated free oil per repeat step can be increased. The total yield of free oil (oil$_1$) remains almost unchanged. As a result, the input of energy from stirring and ultra sound reduces the number of necessary repeat steps. Laboratory experiments showed that after 2-5 repeats no further free oil remains in the separation funnel.

Instead of the miscella, 488 g fresh alcohol is supplied to the reactor, stirred in the reactor and heated to 60° C. Then, the above-described filtration follows. This "washing step" of the extraction residue serves to dissolve the last oil residues and alcohol soluble constituents that are present. Depending on need, this washing step can be repeated as a final step.

For the solvent recovery, the entire miscella and the extract mix are gently evaporated in a rotation evaporator. After removal of the ethanol which is returned to the extraction cycle, a liquid oil phase (oil$_2$) and an orange-red solid phase, the so-called bottom product (consisting of oil, phospholipids, oligosaccharides, phenolic compounds and glucosinolate) remains in the rotation evaporator. The bottom product is thereafter washed with acetone. An acetone insoluble phase, consisting of phospholipids and the oligosaccharides remains and is separated. In the following step of refining/distillation of the acetone, besides a liquid oil phase (oil$_3$), a solid phase is also obtained. The solid phase of the acetone-soluble portion consists mainly of phenolic compounds and the glucosinolates.

The alcohol-moist extraction residue (solid content about 40-60%) is dried under gentle conditions. The so-distilled ethanol is returned to the extraction cycle. The dried extraction meal is light colored and poor in sinapine and glucosinolates. This makes the extraction meal more high-quality than extraction meals from the conventional oilseed production. Having a protein content of over 50% and a residual oil content of ≤3% offers better conditions for the production of high-quality protein preparations as well as high-quality feed stuff.

The replaced oil (oil$_1$), after separation from the separation funnel contains approximately 6-9% ethanol. After a gentle evaporation, the distilled ethanol is returned to the extraction cycle. In oil$_1$, the portion of free fatty acids of 0.03-0.6% is very low. Likewise, the phosphorus content of 0.8-7 ppm is very low. In the extracted oils, oil$_2$ and oils$_3$, the content of free fatty acids and phosphorus is higher.

In the laboratory experiment, about 70% of oil contained in rapeseed is displaced from the seed (oil$_1$). The oil portion extracted from the miscella (oil$_2$) corresponds to about 23% of the oil in the rapeseed. Oil$_3$ obtained from the acetone soluble portion of the bottom product, corresponds to about 4% of oil contained in the rapeseed. The remaining oil remains as residual content in the extraction meal.

The acetone non-soluble portion of the bottom product and the extraction mix, consisting predominantly of phospholipids and oligosaccharldes, represents the phospholipid-rich phase. This lecithin phase is substantially free of water. The conventional path to lecithin production with the steps of oil desliming and a subsequent elaborate drying process are thus eliminated.

Following is the mass balance illustrated for the sample embodiment. From the starting 122 g hulled rapeseed (3% moisture), the following products are obtained:

43 g oil$_1$ (dry, free of ethanol)
14 g oil$_2$
4 g oil
44 g extraction meal (dry, free of ethanol
11 g phopholipids+oligosaccharides
2 g phenolic compounds+glucosinolates
4 g water, evaporated at drying In a further embodiment example, the cell digestion is carried out alternatively with high pressure homogenizer. When selecting the cell digestion method it is a decisive factor that it a complete digestion with a particle size of 30 μm is attained.

In a further example of an embodiment, the separation of the liquid phase (miscella/free oil) from the extraction residue can be selected such as by means of pressure filtration, screen pressing, screen centrifuge or screen decanter. Significant is the ensure separation of fine- and very fine particles from the digestion. With a correspondingly large separation surface and reduction of filter cake formation, the separation time can be reduced to a minimum.

In a further sample embodiment, the separation of the liquid phase is carried out in a sedimentation tank or by means of a centrifugal force. It is Important that prior to the separation of the free oil, the miscella is cooled to preferably 4-25° C. In a continuous method this is accomplished via a heat exchanger.

In a further example of an embodiment, the extraction is carried out by 1-6 bar, preferably at an ambient pressure below the boiling temperature of the solvent.

In a further example of an embodiment, the alcohol-moist extraction residue is first mechanically pressed and thereafter gently dried in a vacuum dryer.

In a further example of an embodiment, the recovery of the ethanol is carried out by means of vacuum evaporation. Prior to evaporation concentrating the miscella can be done by means of membrane separation method, preferably Ultra-filtration.

In a further example of an embodiment, the digestion of hulled rapeseed is carried out with a dispersion tool 6 and the rotor-stator system 1 in the pressure reactor 9. The dispersion tool 6 was installed with a floor distance of 48 mm. In addition, for improved mixing, four immersion pipes 7 are Integrated into the system as baffles. In pressure reactor 9, optimal conditions were chosen for an effective cell digestion. For the cell digestion in pressure reactor 9, a dispersion period of 15 was chosen, a rotation of 20 000 rpm (circumferential speed 18.8 m s$^{-1}$) and a solid content of 20%. Additionally, during the cell digestion, pressure of 1 bar was adjusted in the pressure reactor and in the jacket temperature set at 60° C. Prior to the start of the digestion, the pipe line as well as the reactor were rinsed with nitrogen gas via a gas line, in order to render the pipe line and the pressure reactor Inert and to reduce any oxidative processes.

For the cell digestion with subsequent extraction of oil from the digested rape seeds, ethanol (96.0 vol. %) was used. Corresponding to the desired solid content of 20%, ethanol was combined with the hulled rapeseed resulting in 610 g total mass.

In the experiments, to produce the extract in the pressure reactor 9, the ethanol-oil-mixture was pressed out from the pressure reactor 9 by applying super pressure. In order to obtain a most particle-free as possible extract, an inline filter with a pore size of 15 μm, was integrated into the system. The filtered extract was captured in a separation funnel 10. It consists of liquid phases miscella and free oil. In this example, the extract-mix phase could not be detected.

After filtration, the extraction residue remaining in pressure reactor 9 had residual moisture of about 50-60%. Depending on the experimental set-up, the residue was dried or combined with ethanol. The suspension was manually homogenized with a spatula and after the pressure reactor was closed in pressure-tight manner, rendered inert with nitrogen. By applying the super pressure, the extraction meal was again filtered. According to the experimental set-up, this step was repeated.

What is claimed is:

1. A method for a combined digestion and extraction of oil-containing, seeds, comprising the following steps:
    producing a mash from seed cells of oilseed and ethanol as solvent, said oilseed having oil content of ≥30 mass%,
    digesting the seed cells of the oilseed in ethanol by mechanical means to an average particle size of ≤50 μm, followed by an ethanol extraction, wherein during said ethanol extraction a smaller portion of oil in the seed cells of the oilseed and alcohol soluble constituents dissolve into the ethanol to form a liquid miscella phase, and a larger portion of the oil from the seed cells is being displaced by ethanol to form a free oil phase within the ethanol;
    separating the free oil phase and separating the oil and alcohol soluble constituents from the miscella phase, wherein the free oil phase includes a portion of phosphatides of ≤0.1%, and a portion of free fatty acids of ≤0.5%,
    separating a remaining extraction residue after extraction and removal of residual ethanol from the extraction residue in vacuum at a temperature of <90° C. and a pressure of <500 mbar,
    wherein cell digestion and extraction is carried out in a defined mass-ratio of oilseed to ethanol of 1:3 to 1:8
    wherein the free oil is present as a separate liquid phase and obtained without distillation, and
    wherein the extraction is carried out at below the atmospheric boiling temperature of the ethanol.

2. The method according to claim 1, prior to producing the mash from oilseed arid ethanol and the oilseed is dried to a water content of ≤5%.

3. The method according to claim 1, wherein the ethanol used as an alcoholic solvent has a water content of maximally 5% by weight.

4. The method according to claim 1, wherein the method is carried out as a continuous or, quasi continuous, multistep extraction method configured for parallel flow or reverse flow.

5. The method according to claim 1, wherein the cell digestion is carried out by means of a rotor-stator system or by means of a high pressure homogenizer.

6. The method according to claim 1, further comprising a filtration step wherein the liquid miscella phase and free oil phase are separated from particles after the cell digestion and ethanol extraction, wherein the filtration is carried out by means of pressure filtration, screen filtration, or by a centrifuge or, decanter.

7. The method according to claim 1, applying ultra sound and agitators to accelerate the cell digestion and subsequent separation of the liquid phase.

8. The method according to claim 1, wherein the oilseeds used are selected from rape, flax, sunflower and other oilseeds having an oil content of ≥30 mass%.

9. The method according to claim 1, wherein after concluded fractionation, the miscella is returned to the extraction residue to thereby realize a repeated utilization of the ethanol for further processing of cell digestion and extraction.

10. The method according to claim 1, further comprising the step of recovering the ethanol from the separation of the dissolved oil, the further constituents from the miscella and from the extraction mix and using the recovered ethanol for additional extraction steps.

11. The method according to claim 1, wherein substantially completely hulled oilseeds as well as non-hulled seeds are used.

12. The method according to claim 1, wherein oilseeds are utilized in an integrated oil production course.

13. The method according to claim 1, wherein the free oil phase includes a portion of phosphatides of ≤0.025%.

14. The method according to claim 1, wherein the free oil phase includes a portion of free fatty acids of ≤0.3%.

15. The method according to claim 1, wherein the mass ratio oilseeds to ethanol is 1:5.

16. The method of claim 1, wherein separation of the remaining extraction residue after extraction and removal of residual ethanol from the extraction residue in vacuum is carried out at a temperature of between 50° and 90° C.

17. The method according to claim 1, wherein after concluding the extraction, an alcohol-moist extraction residue is obtained which is mechanically pressed and thereafter dried under gentle condition under vacuum.

* * * * *